United States Patent
Li et al.

(10) Patent No.: US 10,963,702 B1
(45) Date of Patent: Mar. 30, 2021

(54) METHOD AND SYSTEM FOR VIDEO SEGMENTATION

(71) Applicants: Ruiwen Li, Markham (CA); Peng Dai, Markham (CA); Varshanth Ravindra Rao, Waterloo (CA); Juwei Lu, North York (CA); Wei Li, Markham (CA); Jianpeng Xu, Markham (CA)

(72) Inventors: Ruiwen Li, Markham (CA); Peng Dai, Markham (CA); Varshanth Ravindra Rao, Waterloo (CA); Juwei Lu, North York (CA); Wei Li, Markham (CA); Jianpeng Xu, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/566,179

(22) Filed: Sep. 10, 2019

(51) Int. Cl.
  *G06K 9/00* (2006.01)
  *G11B 27/031* (2006.01)
  *G11B 27/30* (2006.01)
  *G06F 40/205* (2020.01)

(52) U.S. Cl.
  CPC ....... *G06K 9/00765* (2013.01); *G06F 40/205* (2020.01); *G06K 9/00718* (2013.01); *G11B 27/031* (2013.01); *G11B 27/3081* (2013.01)

(58) Field of Classification Search
  CPC ............ G06K 9/00765; G06K 9/00718; G06F 40/205; G11B 27/031; G11B 27/3081
  See application file for complete search history.

(56) References Cited

U.S. PATENT DOCUMENTS

| 2007/0253678 A1 | 11/2007 | Sarukkai | |
| 2015/0082349 A1* | 3/2015 | Ishtiaq | H04N 21/4884 725/40 |
| 2016/0014482 A1* | 1/2016 | Chen | H04N 21/26258 386/241 |
| 2019/0362154 A1* | 11/2019 | Moore | G06K 9/00758 |
| 2019/0392866 A1* | 12/2019 | Yoon | G11B 27/031 |

FOREIGN PATENT DOCUMENTS

| CN | 101021857 A | 8/2007 |
| CN | 105744356 A | 7/2016 |
| CN | 108347643 A | 7/2018 |
| CN | 109803180 A | 5/2019 |

\* cited by examiner

*Primary Examiner* — Thai Q Tran
*Assistant Examiner* — Sunghyoun Park

(57) ABSTRACT

Methods and systems for video segmentation and scene recognition are described. A video having a plurality of frames and a subtitle file associated with the video are received. Segmentation is performed on the video to generate a first set video frames comprising one or more video frames based on a frame-by-frame comparison of features in the frames of the video. Each video frame in the first includes a frame indicator which indicates at least a first start frame of the video frame. The subtitle file associated with the video is parsed to generate one or more subtitle segments based on a start and an end time of each dialogue in the subtitle file. A second set of video frames comprising one or more second video frames are generated based on the video frames of the first set of video frames and the e or more subtitle segments.

20 Claims, 8 Drawing Sheets

316

[
{"start_time": <start time of segment>, 325(1)
"end_time": <end time of segment>, 325(2)  ← 325
"scene_label": {
{"first scene label": <label>}, 331
{"second scene label": <label>}, 332
{"third scene label": <label>} 333
},
...
},
...
]

FIG. 3E

METHOD AND SYSTEM FOR VIDEO SEGMENTATION

TECHNICAL FIELD

The present disclosure relates to image processing, in particular methods and systems for video segmentation.

BACKGROUND

Users who view stored videos such as movies, television shows, recorded sporting events and online videos typically have limited options for accessing information about the videos and for searching the content of the videos. At present, users may have options to search videos based on broad categories such as genres, cast, directors, etc. However, a user may wish to search for specific content in the video.

A conventional approach to facilitate searching of video content has been to separate a video into several temporal partitions (e.g., segments), using conventional computer vision techniques, and apply a scene label to each video segment. The video content may then be search based on the scene labels applied to the video segments. Each scene label is generated for each video segment based on the visual features of the video segment, using scene recognition algorithms. However, conventional scene recognition algorithms have inaccuracies. For example, certain shooting styles or video effects in the video may be mistaken for a scene change, resulting in too many video segments that are labeled with scene labels that do not accurately correspond to actual scenes in the video. Inaccurate video segmentation may also result in video segments that start or end in the middle of a dialog in the video, which is also undesirable.

Accordingly, it would be desirable to provide a solution for performing more accurate segmentation of a video, which may enable more accurate labeling of scenes of the video to facilitate searching for content in the video.

SUMMARY

The present disclosure provides methods and systems for video segmentation of a video into a set of video segments and scene recognition for labeling the video segments in the set of video segments. Video segmentation of a video is based on merging video segment corresponds to a dialog in common subtitle segment. This may help to ensure completeness of each video segment and may help to provide more accurate and/or more complete results when a user performs content searching on a video. Scene recognition is performed based on scene analysis of frames of each video segment in the set of video segments generated based on video segmentation the video, and also based on analysis of each subtitle segment. Methods disclosed herein may enable each video segment to be represented using scene labels generated based on various aspects of the video segment. Such methods may help to improve video search accuracy, and may enable identification of each video segment more conveniently and efficiently. In some examples, the methods and systems of the present disclosure may be used in various different applications, such as different video player applications, which may or may not employ machine learning.

In accordance with a broad aspect, the present disclosure provides a method that includes: receiving a video comprising a plurality of frames, and a subtitle file associated with the video; performing video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment; parsing the subtitle file associated with the video to generate one or more subtitle segments based on a start time and an end time of each dialogue in the subtitle file; and generating a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

In accordance with the preceding aspect, the method further comprises: generating, for each second of the second set of video segments, at least one respective first scene label based on scene analysis of a sequence of frames of the second video segment; and generating, for each second video segment of the second set of video segments, a content file comprising the at least one respective first scene label generated for the second video segment.

In accordance with any of the preceding aspects, generating the at least one first scene label for each respective second video segment in the second set of video segments comprises: dividing the respective second video segment of the second set into one or more sub-segments; for each sub-segment, determining a representative frame of the sub-segment; and performing the scene analysis on the representative frame to generate the first scene label corresponding to the sub-segment; wherein the at least one first scene label generated for the respective second video segment includes the first scene label generated for each of the plurality of sub-segments.

In accordance with any of the preceding aspects, each sub-segment includes at least one frame, and determining a representative frame of the sub-segment may comprise: calculating respective scene confidence of each frame; and selecting a frame which satisfies a confidence criterion as the representative frame.

In accordance with any of the preceding aspects, generating the second set of video segments further comprises: extracting, from an audio file corresponding to a respective video segment, one or more audio features corresponding to the video segment; and merging two or more video segments to generate a respective second video segment, the two or more video segments corresponding to audio files having audio features that satisfy a similarity criterion.

In accordance with any of the preceding aspects, the at least one first scene label is generated for each second video segment after the further merging.

In accordance with any of the preceding aspects, the method further includes: generating, for each second video segment, at least one second scene label based on the dialogue of a subtitle segment corresponding to the second video segment, and wherein the at least one second scene label for the second video segment is generated by:extracting one or more words of interest of the corresponding subtitle segment; and selecting one or more representative words to be included in the second scene label, the one or more representative words being selected from a predefined dataset to represent one or more meanings of the one or more words of interest.

In accordance with any of the preceding aspects, method further comprises: for each second video segment, extracting audio features from an audio file of the second video segment, and generating at least one third scene label based on the audio features of the audio file; and wherein generating the content file further comprises adding the at least one third scene label corresponding to each second video segment of the second set of video segments to the content file.

In accordance with any of the preceding aspects, each first scene label is associated with a confidence score.

In accordance with any of the preceding aspects, the method further comprise: identifying at least one second video segment associated with the scene label that satisfies a query criterion; and providing the at least one identified second video segment and one or more the first scene label and one or more second scene label associated with each identified second video segment as an output.

In accordance with another broad aspect, the present disclose provides a system comprising: a memory storing instructions; one or more processors coupled to the memory and configured to execute the instructions to: receive a video comprising a plurality of frames, and a subtitle file associated with the video; perform video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment; parse the subtitle file associated with the video to generate one or more subtitle segments based on a start time and an end time of each dialogue in the subtitle file; and generate a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

In accordance with another broad aspect, the present disclosure provides non-transitory computer-readable medium storing instructions which, when executed by a processor cause the processor to receive a video comprising a plurality of frames, and a subtitle file associated with the video; erform video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment; parse the subtitle file associated with the video to generate one or more subtitle segments based on a start time and an end time of each dialogue in the subtitle file; and generate a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

BRIEF DESCRIPTION OF THE DRAWINGS

FIG. 3E is a schematic diagram illustrating an example generated content file.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

Figure 1:
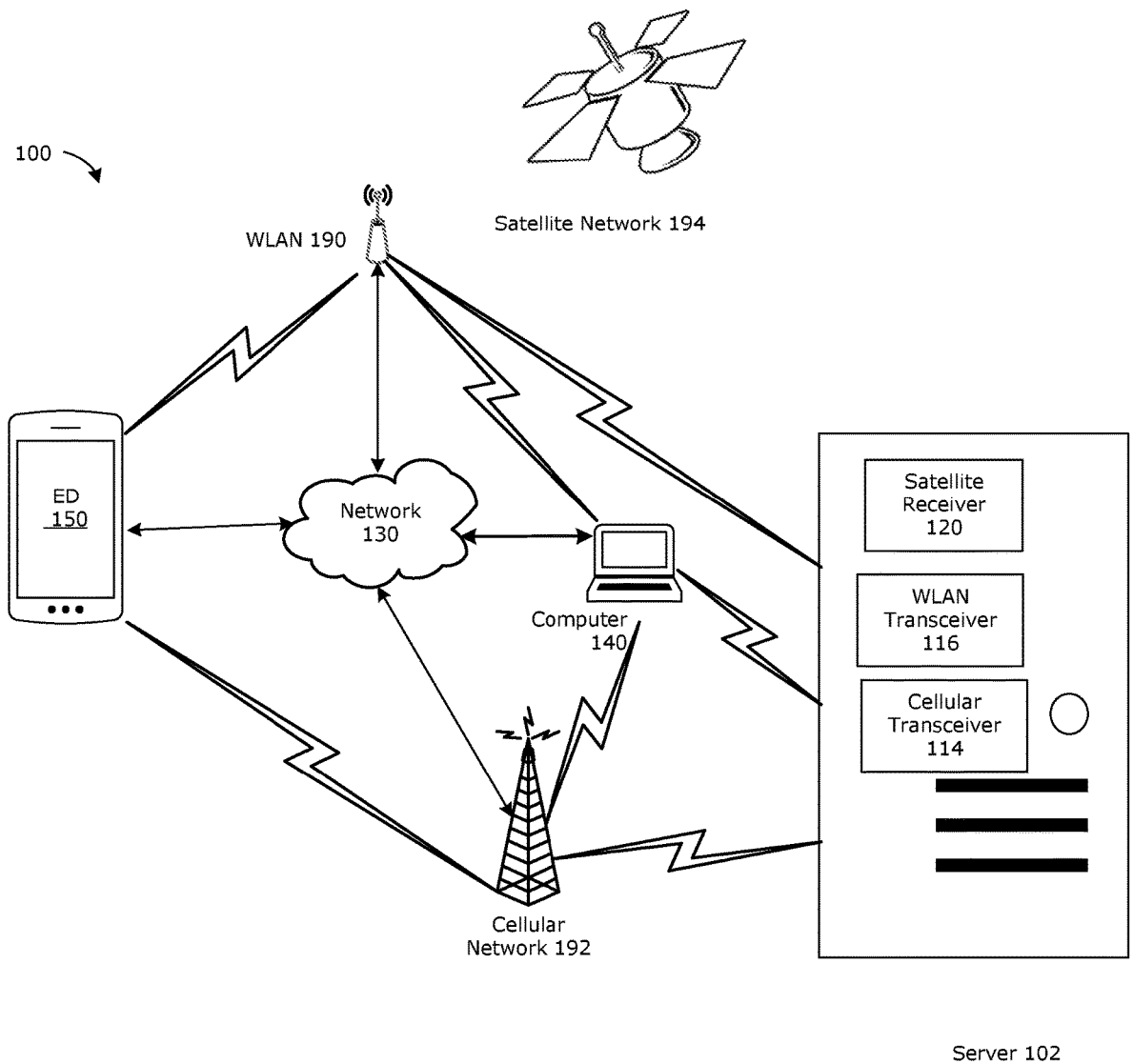
FIG. 1 is a block diagram illustrating a communication system suitable for use with an electronic device (ED) in accordance with an example embodiment.

FIG. 1 is a schematic diagram illustrating an example communication system 100 suitable for operating a server 102 and/or an electronic device (ED) 150 in accordance with examples of the present disclosure. As described in greater detail below, the communication system 100 can include multiple different types of communication networks in communication with the server 102 and each of these communication networks can each be connected directly or indirectly to a further common network 130 such as the Internet, enabling one or more services to be accessed through the network 130. In some applications, the service(s) may be stored within a server 102.

In example embodiments, the communication system 100 may include the ED 150, which is associated with at least one subscriber or a primary user who owns the ED 150.

The server 102 in this example comprises a satellite receiver 120 for receiving satellite signals from a satellite network 194. The satellite network 194 may comprise a plurality of satellites that are part of a global or regional satellite navigation system, for example. In some embodiments, the server 102 may have a satellite transceiver capable of both receiving and sending satellite signals instead of the satellite receiver 120 that can only receives satellite signals.

The server 102 also comprises one or more wireless transceivers for exchanging at least data communications. The wireless transceivers in this example comprise at least a cellular transceiver 114 for communicating with a plurality of different radio access networks (RAN) such as a cellular network 192. The wireless transceivers may also comprise a wireless local area network (WLAN) transceiver 116 for communicating with a WLAN 190 via a WLAN access point (AP). The WLAN 190 may comprise a Wi-Fi wireless network which conforms to IEEE 802.11x standards (sometimes referred to as Wi-Fi®). Other communication protocols may be used for the WLAN 190 in other embodiments.

In the illustrated embodiment, the server 102 may wirelessly interface with the ED 150 directly or indirectly to communicate with each other through communications network 130. In some examples, one or more of the functions described below in respect of the server 102 could be performed at the ED 150 and vice versa, such as implementing various machine-learning algorithms. In some examples, data stored at the server 102 may be stored additionally or alternatively at the ED 150. For example, some resources or data libraries (e.g., video libraries, video repositories, albums or image repositories) may be stored at the server 102, and the ED 150 may access the resources or data libraries stored at the server 102 via the network 130. In other examples, the data libraries may be stored at the ED 150, such as in one or more non-transitory memories internal to the ED 150, and the ED 150 may access the resources or data libraries on the internal non-transitory memories.

The server 102 may be any component (or collection of components) capable of performing video segmentation and scene recognition, and communicating with the ED 150. In some examples, the ED 150 could be a mobile or stationary device such as a smartphone, personal computer such as a desktop or laptop, a smart TV, a tablet devices or any other suitably enabled device.

Figure 2:
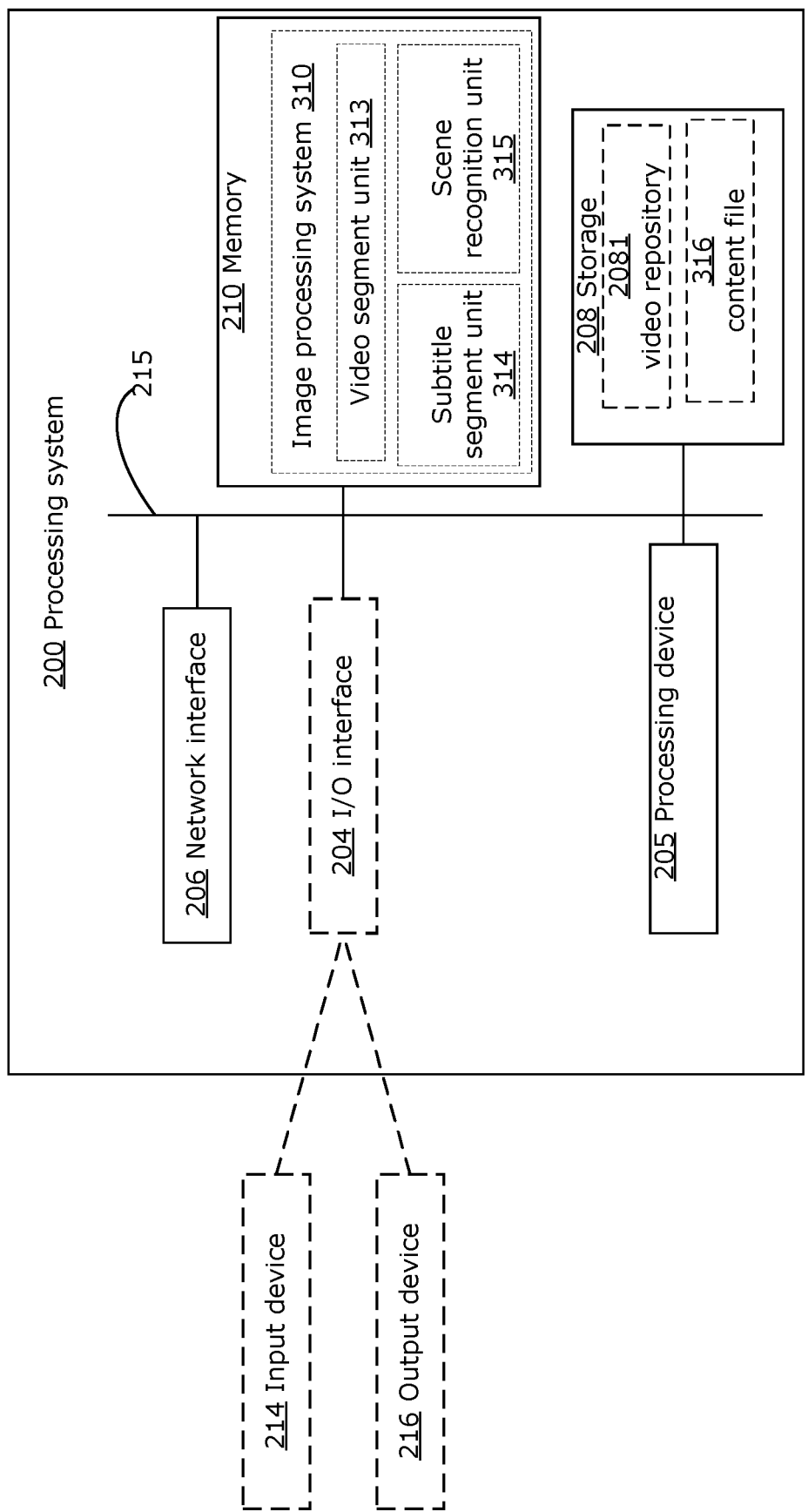
FIG. 2 is a block diagram illustrating an example processing system that can be employed to implement the methods and system disclosed herein.

FIG. 2 is a block diagram of an example simplified processing system 200, which may be used to implement embodiments disclosed herein. The example processing system 200 described below, or variations thereof, may be used to implement the server 102 or the ED 150 or any components of the communication system 100. Other processing systems may be suitable for implementing embodiments described in the present disclosure, and may include components different from those discussed below. Although FIG. 2 shows a single instance of each component, there may be multiple instances of each component in the processing system 200 (e.g., when the processing system 200 is used to implement the server 102 or the ED 150).

The processing system 200 may include one or more processing devices 205, such as a processor, a microprocessor, a graphics processing unit (GPU), a tensor processing unit (TPU), an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or output devices 216. The processing system 200 may include one or more network interfaces 206 for wired or wireless communication with the communication network 130 or peer-to-peer communication with other processing system. The network interface(s) 206 may include wired links (e.g., Ethernet cable) and/or wireless links (e.g., one or more antennas) for intra-network and/or inter-network communications.

The processing system 200 may also include one or more storage unit(s) 208, which may include a mass storage unit such as a solid state drive, a hard disk drive, a magnetic disk drive and/or an optical disk drive. In some example embodiments, the storage unit(s) 208 may include a video repository 2081 for storing videos and/or content files 316 as described in further detail below. The content files may be in a JSON format. Although FIG. 2 illustrates the storage unit(s) 208 including the video repository 2081, in alternative embodiments, the video repository 2081 may be included in one or more remote storage unit(s) that can be accessed remotely via wireless or wired communication network. Details of the content file(s) 316, and the video repository 2081 will be discussed further below.

The processing system 200 may include one or more non-transitory memories 210, which may include a volatile or non-volatile memory (e.g., a flash memory, a random access memory (RAM), and/or a read-only memory (ROM)). The non-transitory memory(ies) 210 may store instructions for execution by the processing device(s) 205, such as to carry out example methods described in the present disclosure. The memory(ies) 210 may store other software (e.g., instructions for execution by the processing device(s) 205), such as an operating system and other applications/functions. In some embodiments, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. In an embodiment, memory(ies) 210 stores an image processing system 310 (hereinafter referred to as system 310), which is a software system that includes machine readable instructions that are stored in the memory(ies) 210 and are executable by the processing device 205. The system 310 includes a video segment unit 313, a subtitle segment unit 314, and a scene recognition unit 315 which are software units (or software subsystems) of the system 310. The video segment unit 313 may be machine-learning based software unit that implements a learned model which performs video segmentation of a video as described in further detail below. The subtitle segment unit 314 may be machine-learning based software unit that implements a learned model which performs audio segmentation of an audio file associated with a video as described in further detail below. The scene recognition unit 315 may be machine-learning based software unit that implements a learned model which performs scene recognition in a video as described in further detail below. In other embodiments, the video segment unit 313 may implement an algorithm which performs video segmentation of a video, the subtitle segment unit 314 may implement an algorithm which performs audio segmentation of an audio file associated with a video, and the scene recognition unit 315 may implement an algorithm that performs scene recognition in a video. In some embodiments, the system 310 may be implemented as a single hardware device, such as an application specific integrated circuit (ASIC), field programmable gate array (FPGA), or a system on a chip (SoC). The hardware device includes electronic circuits that perform the functions of the units 313, 314, 315. In other example embodiments, the system 300 may be implemented as multiple hardware devices (e.g., multiple ASIC, FPGAs, and/or SoCs). Each hardware device includes electronic circuits that perform the functions of one of the units 313, 314, 315. Details of the video segment unit 313, the subtitle segment unit 314, and the scene recognition unit 315 will be discussed further below.

There may be a bus 215 providing communication among components of the processing system 200, including the processing device(s) 205, optional I/O interface(s) 204, network interface(s) 206, storage unit(s) 208 and/or memory(ies) 210. The bus 215 may be any suitable bus architecture including, for example, a memory bus, a peripheral bus or a video bus.

In FIG. 2, the optional input device(s) 214 (e.g., a keyboard, a mouse, a microphone, a touchscreen integrated into a display device which may include a UI and/or a keypad) and optional output device(s) 216 (e.g., a display device which may include a UI, a speaker and/or a printer) are shown as external to the processing system 200. In other examples, one or more of the input device(s) 214 and/or the output device(s) 216 may be an internal component of the processing system 200. In the case of the ED 150, input device(s) 214 may include a display device having a display screen and a user interface (UI) navigation device (for example a touchscreen input, a mouse or a handheld controller) for allowing a user to interact with items displayed by the display device. The output device(s) 216 may also include a display device having a display screen and a user interface (UI) navigation device for displaying generated results of the ED 150.

Traditionally, video segmentation of a video is performed on a frame-by-frame basis by comparing visual features extracted from two sequential frames of the video. Such a comparison may result in too many video segments and does not consider the semantic meaning of the content in the video. As merely visual features of each frame of the video are taken into consideration, some videos may be segmented in a middle of a dialogue (e.g., a conversation). When a user uses the ED 150 to search of a video for specific content, it may be unpleasant and/or inconvenient for the user to receive search results that include incomplete video segments or video segments that do not accurately match a dialogue. In some cases, conventional scene recognition systems may use extracted visual features associated with each video segment to represent a scene of the video segment. Some conventional scene recognition systems are machine-learning based systems that have been trained using images from ideal conditions. Accordingly, when used to perform video segmentation on actual videos (which may include images with non-ideal conditions, such as poor lighting), the scene labels outputted by the conventional scene recognition systems may be inaccurate. In practical applications, such a scene recognition approach may cause a scene of a video segment to be identified inaccurately.

The present disclosure describes example methods for performing video segmentation and scene recognition. Scene labels are generated based on scene analysis of frames of a video segment, and based on the content of a corresponding subtitle segment. In some examples, the generated scene labels for each video segment may enable the video segment to be represented more accurately. In some examples, the disclosed methods and system may enable searching of video segments with less computational cost and improved accuracy. The disclosed methods and systems may be used in various applications, including implementation in wireless communication systems.

Figure 3A:
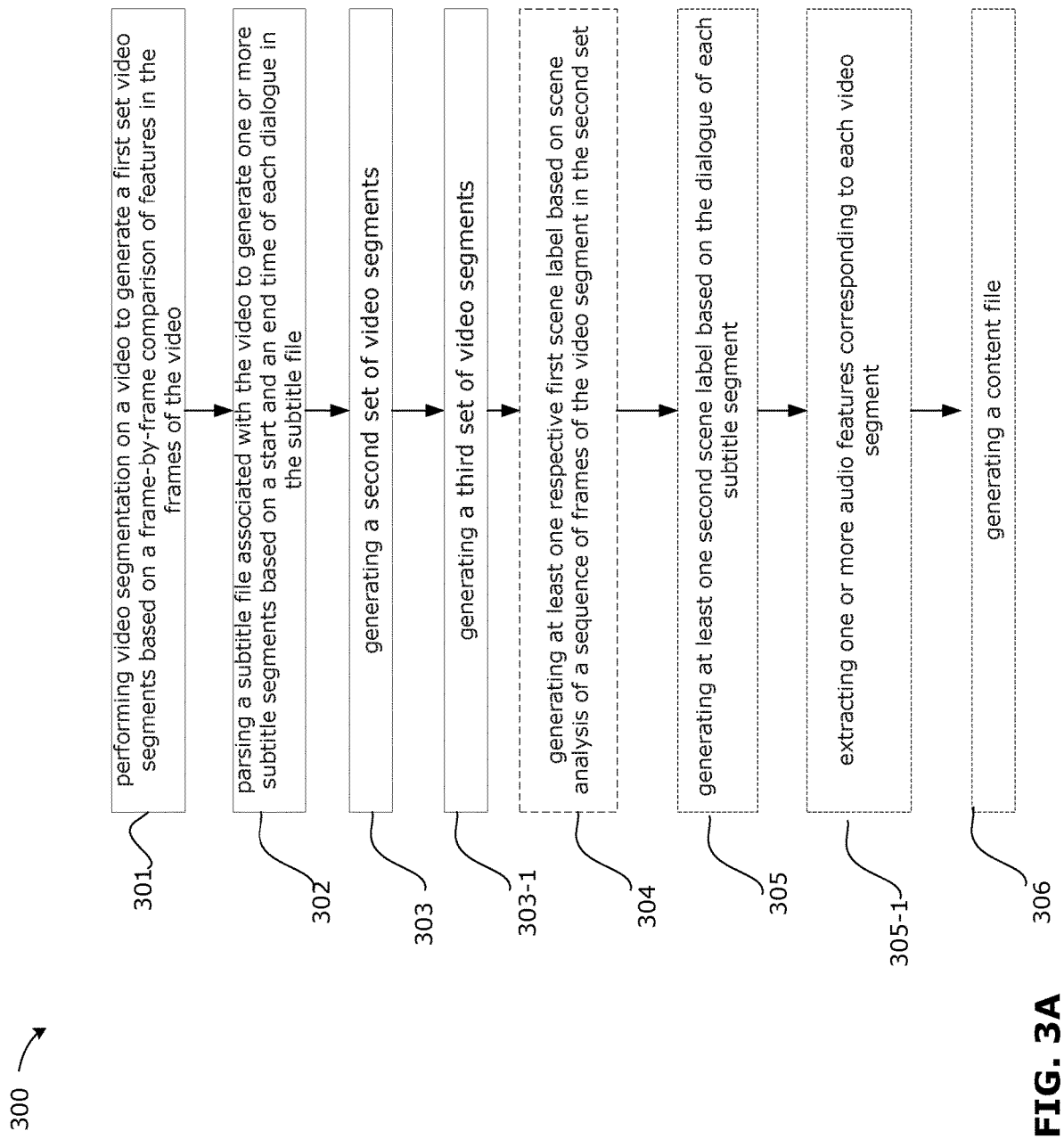
FIG. 3A is a flowchart illustrating an example method for performing video segmentation and scene recognition, in accordance with an embodiment of the present disclosure.
Figure 3B:
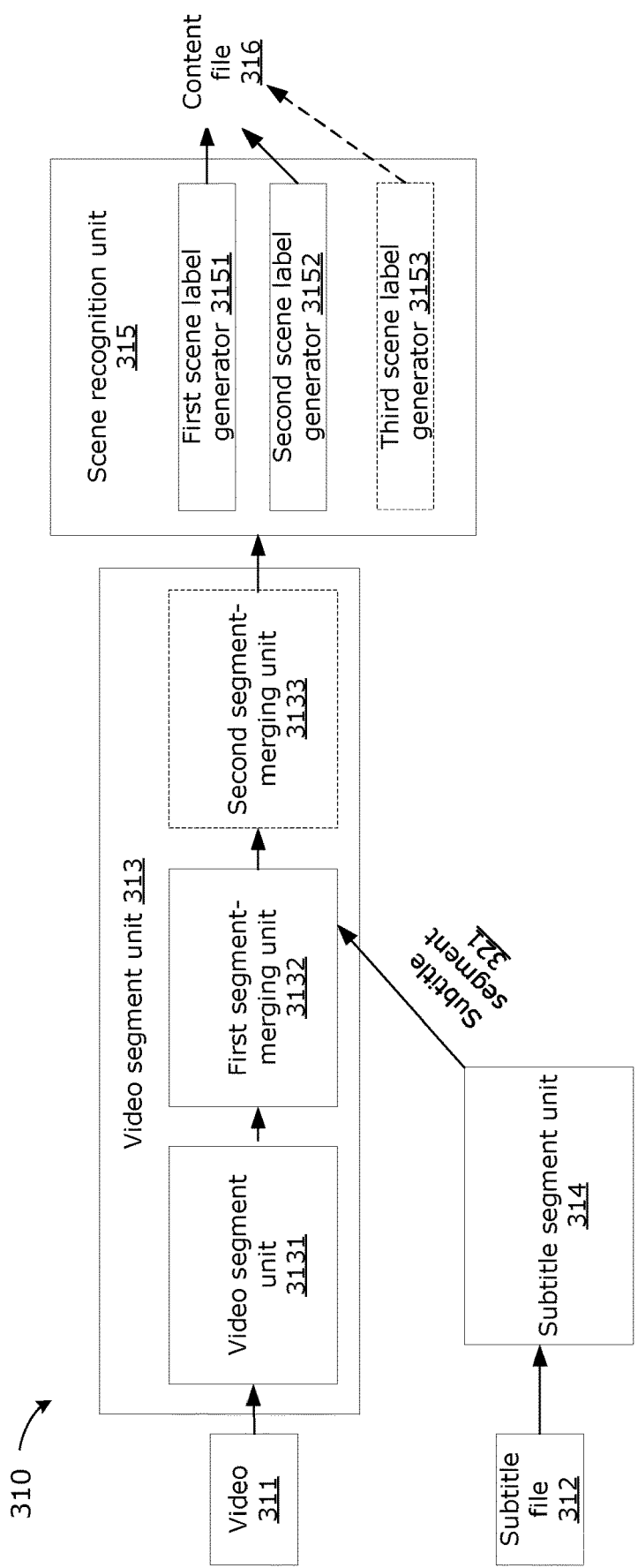
FIG. 3B is a block diagram illustrating an image processing system implementing various algorithms to perform the method of FIG. 3A.
Figure 3C:
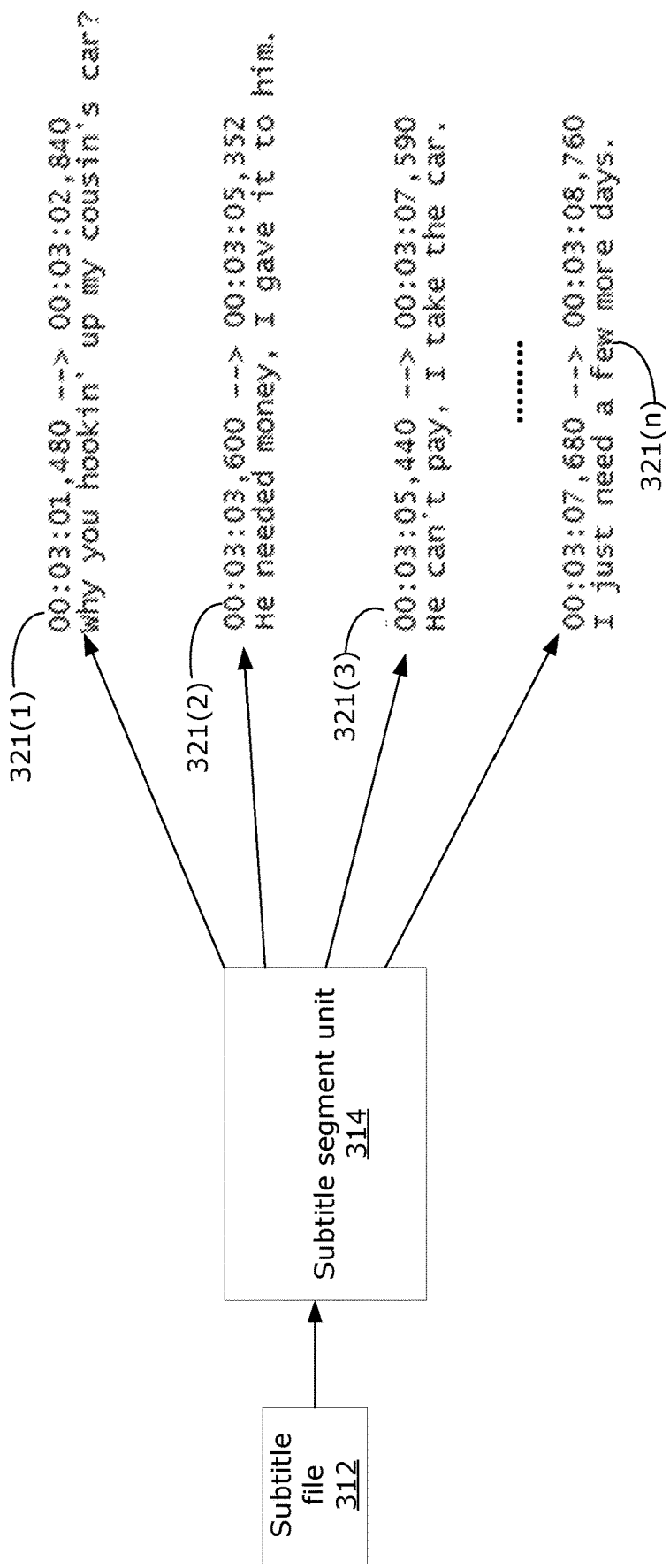
FIG. 3C is a schematic diagram illustrating an example method for generating example subtitle segments.
Figure 3D:
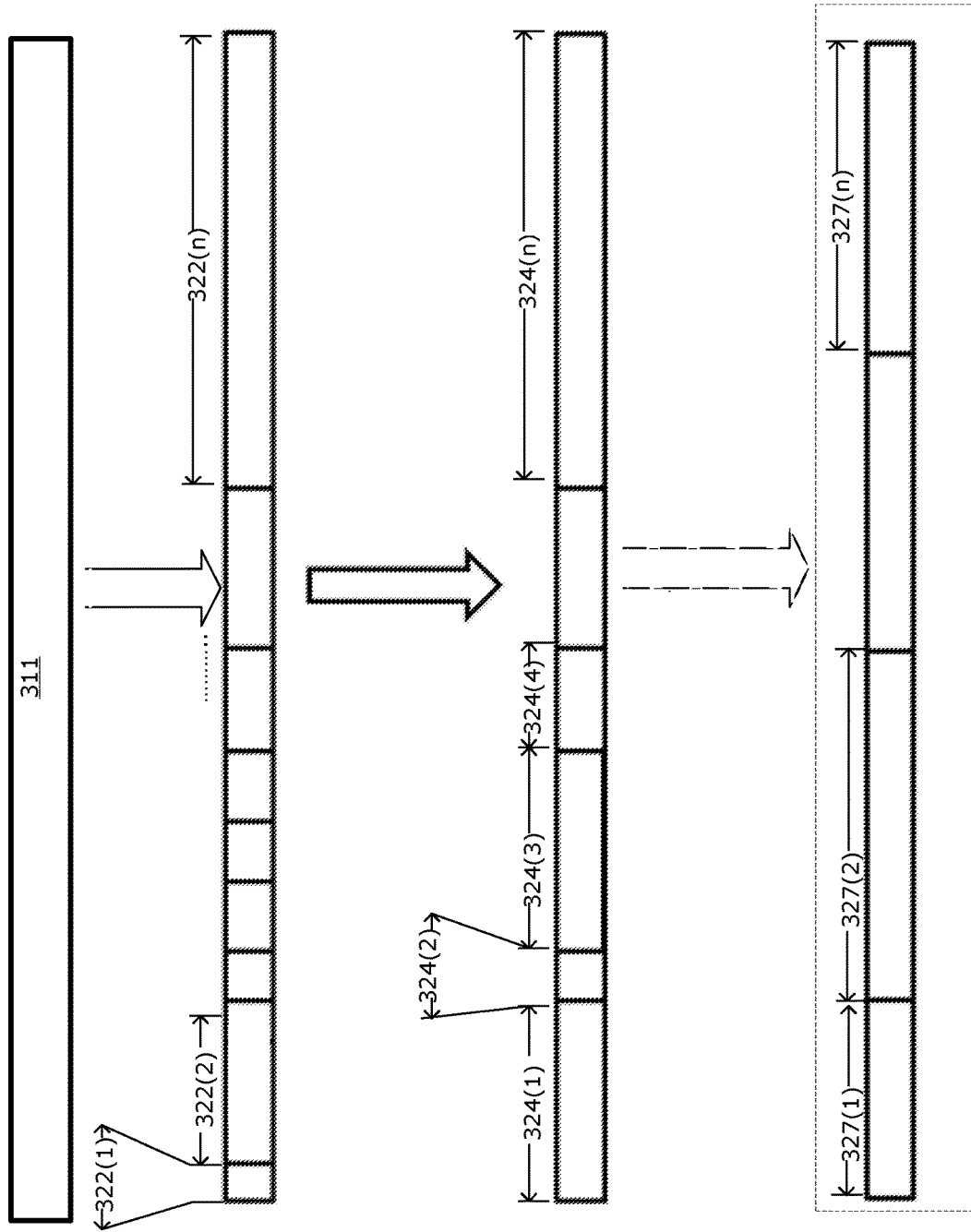
FIG. 3D is a schematic diagram illustrating an example method for performing video segmentation.

FIG. 3A is a flowchart of a method 300 performed by the system 300 of the present disclosure for performing video segmentation and scene recognition according to an example embodiment. FIG. 3B shows a block diagram of the system 310. FIG. 3C shows an example of subtitle segments generated by the subtitle segmentation unit 314. FIG. 3D illustrates an example of video segmentation. FIG. 3E illustrates an example of a content file generated by the system 310. For simplicity, the following discussion refers to the example where one single video and one subtitle file associated with the video are processed, and one single content file is generated by the system 300 for the single video. However, it should be understood that the following discussion may be similarly applicable to cases where multiple different videos are processed and a respective content file is generated for each video. The method 300 is now described. The method 300 is performed on a received video file and the subtitle file associated with the video.

At step 301, video segmentation is performed on a video that includes a sequence of frames to generate a first set of video segments. The first set of video segments includes two or more video segments. The system 310 splits or partitions a video into two or more video segments based on a frame-by-frame comparison of features in the plurality of frames included in the video 311. Each of the two or more video segments includes a sequence of frames of the video. In the example shown in FIG. 3D, the system 310 splits or partitions a video 311 into n video segments (e.g., video segments 322(1) to 322(n) (generically referred to as video segment 322 and collectively referred to as video segments 322). The system 310 also generates, for each respective video segment 322, a label and associates the generated label with the respective video segment 322. Each video segment 322 is identified by its associated label. In some embodiments, the label associated with each respective video segment 322 includes a frame indicator which indicates a start frame of the video segment 322, and an end frame of the video segment 322. The start frame and end frame of the video segment 322 are frame numbers of the video 311. In other embodiments, the frame indicator indicates a start frame and a number of frames in the video segment 322). In other embodiments, the label associated with each respective video segment 322 includes a time indicator that indicates a start time of the video segment 322 and an end time of the video segment 322. Splitting or partitioning a video into video segments 322 will be described further below with reference to FIGS. 3B and 3D.

At step 302, a subtitle file associated with the video 311 is parsed to generate one or more subtitle segments based on a start and an end time of each dialogue identified in a subtitle file, such as subtitle file 312 shown in FIG. 3B. FIG. 3C illustrates an example of subtitle segments 321(1) to 321(n) (generically referred to as subtitle segment 321 and collectively referred to a subtitle segments 321) which are generated by a subtitle segmentation unit 314 (FIG. 3B) of the system 310 (FIG. 3B) from the subtitle file 312 by a subtitle segment unit 314 of the system 310. When the subtitle file 312 is provided as an input to the subtitle segment unit 314, the subtitle segment unit 314 first parses the subtitle file 312 associated with the video 311 to identify each dialogue within the subtitle file 312 and to determine a start time and an end time of each dialogue within the subtitle file 312. The subtitle segment unit 314, and then splits or partitions the video 311 into one or more subtitle segments 321 based on the start time and the end time of each respective dialogue identified in the subtitle file 312. In this example, a dialogue includes a complete sentence. In other examples, a dialogue may include a plurality of sentences which constitute a complete conversation.

At step 303, a second set of video segments is generated based on the video segments 322 and the subtitle segments 321. FIG. 3D illustrates an example of the video segments 324(1) to 324(n) of the second set of video segments (generically referred to hereinafter as second video segment 324 and collectively referred to hereinafter as second video segments 324) generated based on the video segments 322 and the subtitle segments 321. Each second video segment 324 in the second set of video segments includes a sequence of frames of the video 311 and is associated with a label. The second set of video segments includes at least one merged video segment generated by merging two or more video segments 322 in the first set of video segments based on the subtitle segments 321. For example, the second video segment 324(1) is a merged video segment that was generated by merging the video segments 322(1) and 322(2) of the first set of video segments. The second video segments 324 may also include unmerged second video segments 324 (e.g., the second video segment 324(n)), corresponding any remaining video segments 322 of the first set of video segments that are unmerged (i.e. video segments 322 that are not merged with any other another video segment 322). The two or more video segments 322 that are merged to form a merged video segment correspond to a common subtitle segment 321 (i.e., subtitle segment 321 that overlaps the two or more video segments 322(1) and 322(2)). Thus, each second video segment 324 corresponds to a respective subtitle segment 321. Similarly to the first set of video segments, each respective second video segment 324 is associated with a label that identifies the respective second video segment 324. In some embodiments, each respective label associated with a second video segment 324 includes a frame indicator. In some embodiments, the frame indicator may indicate a start frame of the video second segment 324, and an end frame of the second video segment 324. The start frame and end frame of the second video segment 324 are frame numbers of the video 311. In other embodiments, the frame indicator may indicate a start frame and a number of frames in the second video segment 324. In other embodiments, each respective label associated with a second video segment 324 may include a time indicator that indicates a start time of the second video segment 324 and an end time of the second video segment 324. The second video segments 324 in the second set of video frames may be a more accurate reflection of the video content of the video 311, because the video content of the corresponding subtitles has also been taken into account. An example of generating the second set of video frames will be discussed further below with reference to FIGS. 3B-3D.

In some embodiments, the method 300 may include optional step 303-1. At step 303-1, a third set of video segments is generated based on the second set of video segments and audio information obtained from the video 311 for the second video segments 324 in the second set of video segments. The audio information obtained from the video for the second video segments 324 may be audio semantic features. FIG. 3D illustrates an example of the video segments 327(1) to 327(n) of the third set of video segments (generically referred to as third video segments 327 and collectively referred to as second video segments 327). Each third video segment 327 in the third set of video segments includes a sequence of frames of the video 311. In some embodiments, a machine-learning algorithm, such as an audio-extraction machine-learning algorithm, may perform further merging of the second video segments 324 of the second set of video segments based on the audio information for the second video segments 324 obtained from the video 311. Performing the further merging to generate third video segments 327 for inclusion in the third set of video segments will be described in greater detail below with reference to FIG. 3D.

At step 304, for each second video segment 324 of the second set of video segments (or each third video segment 327 of the third set of video segments if optional step 303-1 is performed) frames, at least one first scene label is generated based on scene analysis of one or more frames of the second video segment 324 (or third video segment 327). In some embodiments, generating the at least one first scene label may be performed by a first scene label generator, such as the first scene label generator 3151 shown in FIG. 3B. The first scene label generator 3151 may implement any suitable algorithm for performing scene analysis of the frame(s) in a second video segment 324 (or third video segment 327 if step 303-1 is performed). For example, the first scene label generator 3151 may be a machine learning module that has learned a model for performing scene analysis of the frames(s) of a second video segment 324 (or third video segment 327 if step 303-1 is performed), as discussed in further detail below. The learned model of the machine learning module analyses visual features of representative frame(s) of a second video segment 324 (or third video segment if step 303-1 is performed), and generates at least one first scene label for the second video segment 324 (or third video segment 327 if step 303-1 is performed). The machine learning module may learn the model using any suitable machine learning algorithm and a training dataset comprising videos. In some embodiments, the first scene label generator 3151 may include a first neural network that has been trained using a training dataset to extract visual features (e.g., objects, actions occurring in the frame, and/or background environment) from a frame of the second video segment 324 (or a frame of the third video segment 327 if step 303-1 is performed) and generate a corresponding first scene label for the second video segment 324 (or third video segment 327 if step 303-1 is performed). By way of non-limiting example, the first neural network may be a deep neural network that includes an input layer, multiple hidden layers, and an output layer. The first neural network can be trained, for example, to satisfy an accuracy requirement for the visual feature extraction. Generation of the first scene label based on scene analysis of frames of a second video segment 324 (or third video segment 327 if step 303-1 is performed) will be described further below with reference to FIG. 3B.

At step 305, for a second video segment 324 of the second set of video frames (or a third video segment 327 of the third set of video frames if step 303-1 is performed), at least one second scene label is generated based on the dialogue in each subtitle segment 321. The second scene label(s) may include or be based on one or more salient words extracted from each subtitle segment 321. In some embodiments, generating at least one second scene label may be performed by a second scene label generator, such as the second scene label generator 3152 shown in FIG. 3B. The second scene label generator 3152 may implement any suitable algorithm for generating at least one second scene labels from the subtitle segments 321. For example, the second scene label generator 3152 may be a machine learning module that has learned a model for performing extraction of salient words from the subtitle segments 321. The learned model of the machine learning module extracts salient words from the from the subtitle segment 321 and generates at least one second scene label for a second video segment 324 (or a third video segment 327 if step 303-1 is performed). The machine learning module may learn the model for performing extraction of salient words from a subtitle segment 321 using any suitable machine learning algorithm and a training dataset comprising videos and subtitles. In some embodiments, the second scene label generator 3152 may include a second neural network that has been trained using a training dataset to extract salient words from a subtitle segment 321. By way of non-limiting example, the second neural network may include an input layer, multiple hidden layers, and an output layer. The second neural network can be trained, for example, based on an accuracy requirement of the salient words extraction. The salient words indicate one or more words of interest in each subtitle segment 321 and are used to generate the second scene label(s), as discussed further below.

At step 305-1, one or more audio features corresponding to each second video segment 324 in the second set of video segments (or each third video segment 327 if step 303-1 is performed) may be extracted from an audio file associated with the video 311. In particular, the audio features may be extracted for each second video segments 324 (or each third video segment if step 303-1 is performed), for example by using the label associated with each respective second video segment 324 (or the label associated with each respective third video segment 327 if step 303-1 is performed) to identify which portion of the audio file corresponds to the respective second video segment 324 (or the respective third video segment) and extracting audio features for the respective second video segment 324 (or the third video segment if step 303-1 is performed) accordingly. Using the extracted audio features, one or more third scene labels are generated to represent an additional aspect (e.g., audio features) of the second video segment 324 (or the third video segment if step 303-1 is performed). In some embodiments, for each second video segment 324 (or third video segment 327 if step 303-1 is performed), extracting the one or more audio features may be performed by a third scene label generator, such as the third scene label generator 3153 shown in FIG. 3B. The third scene label generator 3153 may implement any suitable algorithm for generating one or more scene labels using audio features. For example, the third scene label generator 3153 may be a machine learning module that has learned a model for generating one or more scene labels using audio features. The learned model of the machine learning module performs feature extraction on the audio file associated with the video 311 to generate the one or more third scene labels. The machine learning module may learn the model using any suitable machine learning algorithm and a training dataset comprising audio features. In some embodiments, the third scene label generator 3153 may include a third neural network that has been trained with a training dataset comprising audio features. By way of non-limiting example, the third neural network may include an input layer, multiple hidden layers, and an output layer. The third neural network can be trained, for example, to satisfy an accuracy requirement for the visual feature extraction. Generation of the one or more third scene labels will be discussed further below.

At step 306 a content file (e.g., a content file 316 shown in FIG. 3B) is generated for each second video segment 324 of the second set of video segments (or each third video segment 327 of the third set of video segments if step 303-1 is performed). The content file generated for each respective second video segment 324 of the second set of video segments (or each respective third video segment if step 303-1 is performed) includes the label associated with the second video segment 324 (or the label associated with the third video segment 327 if step 303-1 is performed), the at least one first scene label generated for the respective second video segment 324 (or the at least one first scene label generated for the respective third video segment 327 if step 303-1 is performed) and the at least one second scene label corresponding to the respective second video segment 324 (or the at least one second scene label corresponding to the respective third video segment 327 if step 303-1 is performed). In this embodiment, each content file 316 may have a JavaScript Object Notation (JSON) format, although other suitable formats can be used in alternative embodiments. In some embodiments, a single content all the second video segments 324 (or all the third video segments 327 if step 303-1 is performed) may be generated that has the JSON format. The single content file 316 includes the label associated with each of the second video segments 324 (or the label associated with each of the second video segments 327 if step 303-1 is performed).

As noted above, in some embodiments, the optional step 303-1 is performed to generate the third set of video segments comprising one or more third video segments 327. In these embodiments, steps 304, 305, 305-1 are performed on each third video segment 327 of the third set of video segments instead of the second video segments 324 of the second set of video segments.

Details of an example implementation of the method 300 are now described with reference to FIGS. 3B-3D in which step 303-1 is not performed. FIG. 3E provides an example of a content file 316 that a scene label for a second video segment 324 that includes at least one first scene label corresponding to the respective second video segment 324 and at least one second scene label corresponding to the respective second video segment 324. With reference to FIG. 3B, a video 311 (which includes a sequence of frames) is provided as an input to a video segment unit 313, and a subtitle file 312 associated with the video 311 is provided to a subtitle segment unit 314. In this example, the video 311 and the subtitle file 312 may be stored in the video repository 2081 of the processing system 200, and may be retrieved by the processing unit of the system 310. In other examples, the video 311 and the subtitle file 312 may be stored in the video repository 2081 within one entity of the communication system 100, and be sent to the system 310.

As shown in FIG. 3B, the video segment unit 313 splits or partitions the video 311 based on frame-by-frame comparison of features of frames of the video 311 and generates the first set of video segments comprising video segments 322. In this example, the video segment unit 313 may include a video segment unit 3131, and a first segment-merging unit 3132. The video segment unit 3131 may process the video by performing a frame-by-frame comparison of features of frames of the video 311 to generate the first set of video segments comprising video segments 322, as described above with reference to step 301 of the method 300. The processing of the video 311 by the video segment unit 3131 may be referred to as a first level segmentation. As discussed above, the video 311 is first split or partitioned into two or more video segments 322, based on analysis of changes in features of sequential frames of the video 311. For example, the video 311 includes a sequence of frames. The video segment unit 3131 may calculate characteristics associated with each frame of the video 311 (e.g., with respect to pixel color, background content, a number of people (i.e., characters) in a frame, or other content or combinations thereof), and determine a change in at least one characteristic between two sequential frames of the video 311. The video segment unit 3131 then performs video segmentation based whether determined frame changes satisfy a segmentation criterion. For example, a segmentation criterion for the first level segmentation may related to change in people content between two sequential frames. The segmentation criterion may define a threshold for determining whether a change in people content (e.g., change in total number of people between two sequential frames in the video 311 is greater than 2) should result in a first level video segmentation (e.g., the first set of video frames comprising video frames 322). In another example, another segmentation criterion may be determined by the following Equation (1):

$$\Delta I_{hsv} = \frac{\sum_{i=1}^{3}\left(\sum_{pixels}\frac{\|I_{curr\_hsv}-I_{last\_hsv}\|}{\text{total number of pixels}}\right)}{3} \quad \text{Equation (1)}$$

where $\Delta I_{hsv}$ denotes differences between a current frame of the video 311 and a preceding frame of the video 311, $I_{curr\_hsv}$ represents attribute values of each pixel in the current frame, $I_{last\_hsv}$ represents attribute values of each pixel in the preceding frame. The Equation (1) is used to calculate the differences between the current frame and the preceding frame in the video 311, in order to estimate changes between two sequential frames of the video 311.

The video segment unit 3131 may perform the first level video segmentation using one segmentation criterion, or multiple segmentation criteria.

Based on the determined frame changes in a sequence of frames of the video 311, the video segment unit 3131 generates the first set of video segments comprising video segments 322, generates a label for each respective video segment 322, and associates the label for each respective video segment 322 with the respective video segment 322 as illustrated in FIG. 3D. The label associated with each respective video segment 322 may include a frame indicator for the respective video segment 322.

In this embodiment, the frame indicators, including at least a start frame, may further include a start time of the start frame and/or an end time of an end frame. The generated first set of frame indicators will be then used for a further segment merging (e.g., a first segment-merging as discussed below) as discussed below.

Generation of the second set of video segments is now illustrated in greater detail with reference to FIGS. 3B-3D. Referring to FIG. 3B again, using the subtitle segments 321 and the video segments 322 of the first set of video segments, the first segment-merging unit 3132 performs first segment-merging to merge video segments 322. The second set of video segments is generated by the first segment-merging unit 3132, as discussed above with respect to step 303 of the method 300. In some embodiments, the first segment-merging unit 3132 may first determine whether the subtitle segment 321 corresponds to one or more of the video segments 322. For example, as shown in FIGS. 3C and 3D, the first segment-merging unit 3132 may determine whether a start time of a start frame of the video segment 322(1) corresponds to a start time of a subtitle segment (e.g., the subtitle segment 321(1)), and an end time of an end frame of the video segment 322(2) corresponds to an end time of the subtitle segment 321(1). The "corresponding relationship" disclosed herein between a subtitle segment 321 and a video segment 322 (or video segments 322) may include exact alignment (e.g., identical start times and/or end times between the subtitle segment 321 and the start times/frames and/or the end times/frames of the video segments 322), overlapping with (e.g., a portion of the subtitle segment 321 and a portion of the video segments 322 overlap with each other), encompassed by (e.g., a time duration of the video segment(s) 322 is encompassed by a time duration of the subtitle segment 321 and vice versa), and so on. Thus, when the video segments 322 (e.g., the video segments 322(1) and 322(2)) correspond to the common subtitle segment 321 (e.g., 321(1)), exact alignment(s) of start times and/or end times between the subtitle segment 321 and start and/or end frames of the video segments 322 are not necessarily required. For example, a conversation of the subtitle segment 321(1) may start several seconds after the start time of the start frame of the video segment 322(1) in which a scene change occurs, however, the conversation is still determined to correspond to the video segment 322(1).

The first segment-merging unit 3132 then generates the second set of video segments in accordance with the subtitle segment 321 and the first set of video segments comprising the video segments 322. As shown in FIG. 3D, a second video segment 324(1) is generated by merging the video segments 322(1) and 322(2). A label is also generated for the second video segment 324(1), and the label is associated with the second video segment 324(1). The label associated with the second video segment 324(1) may be a frame indicator that identifies a start frame of the second video segment 324(1) and an end frame of the second video segment 324(1). In this embodiment, the start frame of the second video segment 324(1) may be determined to be the frame of the video segment 322(1) that is closest to a start time of the subtitle segment 321(1), and the end frame of the second video segment 324(1) may be the frame of the video segment 322(2) that is closest to an end time of the subtitle segment 321(1). In other embodiments, the start frame of second video frame 324(1) may be determined to be the start frame of the video segment 322(1), and the end frame of the second video segment 324(1) may be equal to the end frame of the video segment 322(2).

In other embodiments, other factors may be taken into account to generate a label that is to be associated with the second video frame 324(1). Such factors may include, for example, the start and end times of each subtitle segment 321, the start time of a start frame and the end time of an end frame of each video segment 322(1) and 322(2) that are merged to generate the second video segment 324(1), the end time of a previous dialogue and the start time of a next dialogue, and/or a transitional time duration to account for scene transitions.

For example, when a label associated with a second video segment 324 includes an indicator that indicates a start time of the second video segment 324 (denoted by CB_START), and an end time of the second video segment 324 (denoted by CB_END), then the start time (CB_START) and the end time (CB_END) of the second video segment 324 are determined by Equations (2) and (3) respectively.

$$CB\_START=Max(Sub\text{-}B\_START\text{-}CONTEXT\_DE\text{-}LAY\_IN, PREV\_DIALOG\_END, SB\_START) \quad \text{Equation (2)}$$

$$CB\_END=Min(Sub\text{-}B\_END+CONTEXT\_DELAY\_OUT, NEXT\_DIALOG\_START, SB\_END) \quad \text{Equation (3)}$$

Where Sub-B_START represents a start time of a subtitle segment (e.g., 321(1)), CONTEXT_DELAY_IN denotes a time duration for transition-in cut-off, PREV_DIALOG_END denotes an end time of a subtitle segment (if there exist) preceding to the subtitle segment 321(1) and SB_START denotes a start time of closest frame outside or on the subtitle segment 321(1); Sub-B_END represents an end time of the subtitle segment (e.g., 321(1)), CONTEXT_ DELAY_OUT denotes a time duration for transition-out, NEXT_DIALOG_START denotes a start time of a subtitle segment 321(2) subsequent to the subtitle segment 321(1), and SB_END represents an end time of closest frame outside or on the subtitle segment 321(1). Using the Equations (2) and (3) may enable the label for each second video segment 324 to be generated more accurately.

In some embodiments, a video segment 322 may correspond to a complete subtitle segment 321 (e.g., corresponding to a completed conversation). Thus, the first segment-merging unit 3132 may determine (e.g., using the comparison and equations discussed above) that no merging is required for the video segment 322. Accordingly, the video segment 322 may be simply copied into the second set video segments. In this embodiment, the second set of video segments may include merged video segments (i.e., one or more video segments 322 that have been merged together to form a second video segment 324, such as second video segment 324(1) shown in FIG. 3D), and some remaining unmerged video segments 322 of the first set of video segments (e.g., the second video segment 324(n) shown in FIG. 3D). The merging of one or more video segments 322 of the first set of video segments to form merged video segments ensures completeness of each second video segment 324 in the second set of video segments, and avoids segmenting a video 311 in the middle of a dialogue.

In some embodiments, the video segment unit 313 may include a second segment-merging unit 3133 that is configured to perform second-level segmentation 324 as discussed above with reference to optional step 303-1. The second segment-merging unit 3133 is configured to process each video segment 324 to extract audio features from an audio file corresponding to the each second video segment 324, and merge the second video segments 324 that correspond to audio features that satisfy a similarity criterion. For example, the second segment-merging unit 3133 may process each respective second video segment 324 by applying an audio-extraction algorithm to an audio file corresponding to the respective second video segment 324 to extract one or more audio features from the audio file corresponding to the respective second video segment 324. Each audio feature may include a feature of an ambient sound (e.g., wind, water, birds, crowds, office noises, traffic, etc.) corresponding to each video second video segment 324. The second segment-merging unit 3133 merges the second video segments 324 that correspond to audio features that satisfy a similarity criterion to form a third video segment 327. The similarity criterion could be a criterion which stipulates that the audio features corresponding to two (or more) sequential second video segments 324 should have similarity or correlation above a threshold in order for those second video segments 324 to be merged. Any other suitable similarity criterion could be used.

For example, as shown in FIG. 3D, audio features of the second video segments 324(2) to 324(4) are extracted and determined to satisfy a similarity criterion (e.g., include chirping features produced by birds). The second segment-merging unit 3133 may merge the second video segments 324(2)-324(4) to generate a third set of video segments comprising third video segments 327(1) to 327(n). Each third video segment 327 in the third set of video segments includes a label. The label may identify start frame of the third video segment 327, and an end frame of the third video segment 327. Similarly to the second set of video segments discussed above, the third set of video segments may also include one or more unmerged video segments (e.g., video segments 324 from the second set of video segments that have not been merged). For example, the third video segment 327(1) illustrated in FIG. 3D is an unmerged video segment and is the same as the second video segment 324(1)).

By way of non-limiting example, the second segment-merging unit 3133 may implement any suitable algorithm for merging second video segments 324 of the second set of video segments. In some embodiments, the second segment-merging unit 3133 may include a model that is learned during a training process. The learned model merges video segments 324 of the second into the third video segments 327. In some embodiments, the second segment-merging unit 3133 may include a neural network that has been trained with a training dataset to extract audio features and classify the audio features (i.e., predict a class for the extracted audio features). By way of non-limiting example, in an embodiment, the neural network includes an input layer, multiple hidden layers, and an output layer. The neural network may be a trained deep 1 dimensional convolution neural network, such as the neural network described in Aytar, Yusuf & Vondrick, Carl & Torralba, Antonio. (2016). SoundNet: Learning Sound Representations from Unlabeled data. The trained deep 1 dimensional convolution neural network may be used to extract audio features from each of the second video segments 324 of the second set of video segments and the waveforms extracted from each of the second video segments 324. The trained deep 1 dimensional convolution neural network enables each extracted audio feature to be enriched semantically using visual features of the video segments 324. In other embodiments, the second segment-merging unit 3133 may include other suitable neural networks that are trained to extract audio features correlating to each video segment 324, for example, based on an accuracy requirement of the audio features extraction.

Referring to FIG. 3B again, scene recognition and generation of a content file 316, which may be performed by a scene recognition unit 315, is now discussed with greater detail. FIG. 3E shows an example of a content file 316. For simplicity, the following discussion refers to the example where the second segment-merging unit 3133 is not used, and there is no third set of video segments. Each second video segment 324 of the second set of video segments therefore serves as a video segment upon which scene recognition is performed by the scene recognition unit 315. However, it should be understood that the following discussion may be applicable to embodiments where the second segment-merging unit 3133 is used to merge one or more video second segments 324. In these embodiments, each third video segment 327 of the third set of video segments of the third set of video segments serves as a video segment upon which scene recognition is performed by the scene recognition unit 315.

As shown in FIG. 3B, the scene recognition unit 315 includes a first scene label generator 3151, and a second scene label generator 3152. The scene recognition unit 315 generates scene labels to be included in a generated content file 316. The content file 316, which may have been generated with reference to step 306 of the method 300, includes one or more first scene labels 331(1) to 331(n) (generically referred to as first scene label 331 and collectively referred to as first scene labels 331) and one or more second scene labels 332 corresponding to each second video segment 324. The first scene label generator 3151 performs scene recognition based on visual features of one or more frames of the video segment 324, which can be also referred to as a first level scene recognition. The second scene label generator 3152 performs scene recognition based on context of the subtitle segment corresponding to the second video segment 324, which can be referred to as a second level scene recognition.

The first scene label generator 3151 generates at least one first scene label 331 based on scene analysis of the frame(s) of each second video segment 324, for example as disclosed above with respect to step 304 of the method 300. Prior to generating at least one first scene label 331 for each second video segment 324, representative frame(s) of the second video segment 324 for performing the scene analysis may be first selected. An example method for selecting the representative frame(s) of the second video segment 324 is now discussed. The scene recognition unit 315 may divide the second video segment 324 into one or more sub-segments. The number of the sub-segments may be predetermined and fixed (e.g., 10 sub-segments regardless of the number of frames in the second video segment 324). In some embodiments, the number of frames in each sub-segment may be varied (e.g., every 20 frames in the second video segment 324 is a sub-segment). In respect to each sub-segment, the scene recognition unit 315 may determine a representative frame of the sub-segment. For example, the sub-segment may include more than one frame and only one frame from the sub-segment is selected as a representative frame for performing scene recognition. The scene recognition unit 315 may select the representative frame by calculating scene confidence for each candidate in a set of candidate frames in the sub-segment (e.g., 20 candidate frames may be randomly selected from the sub-segment). For example, scene confidence may be calculated according to any suitable algorithm (e.g., Chromatic Skewness and Facial & Human Dominance). Then a candidate frame which satisfies a confidence criterion may be selected as the representative frame of the sub-segment. The confidence criterion can include a criterion that may stipulate that the candidate frame having the highest calculated scene confidence is selected as the representative frame, for example.

After the representative frame(s) are selected, the first scene label generator 3151 performs scene analysis on the representative frame(s) in order to generate at least one first scene label 331 for the sub-segment. In this embodiment, the scene analysis may include extracting attributes from the representative frame by scene type (e.g., "beach", "ship deck", "carnival", "castle", "dining hall"). In other embodiments, the scene analysis may include extracting attributes from the representative frame by any suitable types, such as a type of action occurring in the segment (e.g., "jogging", "conversation", "argument", "eating", "fighting", etc.). The first scene label generator 3151 generates at least one first scene label 331 based on the extracted attributes of the representative frame.

In some embodiments, the first scene label generator 3151 may include one or more classifiers, such as a local classifier which implements a learned hierarchical classification model that maps the first scene label 331 to a node of a hierarchical tree, in accordance with prediction probability of the at least one first scene label 331. The leaf nodes of the hierarchical tree correspond to first scene labels 331 having lowest confidence scores, and the root nodes correspond to first scene labels 331 having highest confidence scores. In some embodiments, each first scene label 331 is assigned a confidence score. For example, "outdoor", "water body", "underwater" are the generated first scene labels 331 based on the extracted attributes of a representative frame, and are mapped to a 3-level hierarchical tree. In this embodiment, "outdoor" is mapped to a root node, and "underwater" is mapped to a leaf node. Thus, "outdoor" is assigned a highest confidence score, for example being denoted by "1st", and "underwater" is assigned a lowest confidence score, for example being denoted by "3rd". For each sub-segment of the second video segment 324, one or more first scene labels 331 (i.e., labels corresponding to different confidence scores) may be generated. In some embodiments, generation of the first scene label 331 may be performed in parallel for multiple sub-segments, or in serial, depending on available computational resources of the system 310. In this embodiment, selection of representative frame(s) for each sub-segment may be performed by the scene recognition unit 315. In other embodiments, the selection of representative frame(s) for each sub-segment may be performed by the first scene label generator 3151.

The scene recognition unit 315 also includes a second scene label generator 3152 that processes each subtitle segment 321 to generate one or more second scene labels for the video segment 324, for example as disclosed above with respect to step 305 of the method 300. As discussed above, the second scene label(s) is/are generated based on salient words of each subtitle segment 321. The scene label generator 3152 may process each respective subtitle segment 321 using a natural language processing (NLP) algorithm to capture semantic features of the respective subtitle segment 321 in accordance with the dialogue of the subtitle segment 321. The semantic features may include one or more words of interest (also referred to as salient words), which reflect semantic meaning of the dialogue of the subtitle segment 321. In this embodiment, the second scene label generator 3152 processes each subtitle segment 321 using a NLP algorithm to generate a word embedding for the subtitle segment 321. The word embedding is used to remove common words, and capture meanings, semantic relationships and different types of contexts within the dialogue of each subtitle segment, to extract the salient words. The salient words are then mapped to vector representations, and the word embedding maps the vector representations to words of a predefined dataset, such as a text classification dataset. In this embodiment, one or more words may be selected from the text classification dataset (i.e., a dictionary), such as 20NewsGroup as representative words to reflect meaning of the salient words. The one or more selected words are then used to by the second scene label generator 3152 to generate second scene label(s) 332 for the second video segment 324.

In some embodiments, the scene recognition unit 315 may further include a third scene label generator 3153, which may be applied to implement scene recognition based on audio features corresponding to each second video segment 324. This process may be referred to as a third level scene recognition, for example as described above with reference to optional step 305-1 of the method 300. The third scene label generator 3153 may process the second video segment 324 to extract audio features from an audio file corresponding to the second video segment 324. In this embodiment, third scene label generator 3153 may process the video segment 324 using an audio-extraction algorithm to extract audio features from an audio file corresponding to the second video segment 324. Alternatively, the third scene label generator 3153 may implement a deep 1 dimensional convolution neural network to extract audio features from an audio file corresponding to the second video segment 324. The deep 1 dimensional convolution neural network may have an architecture as described in Aytar, Yusuf & Vondrick, Carl & Torralba, Antonio. (2016). SoundNet: Learning Sound Representations from Unlabeled data. Each audio feature may reflect background sounds present in a second video segment 324. The third scene label generator 3153 then uses the background sounds to infer a scene type. The inferred scene type is then included by at least one third scene label 333. The content file 316 may additionally include the at least one third scene label 333.

As shown in FIG. 3E, for each second video segment 324, the content file 316 may also include a time indicator 325 generated by the first segment-merging unit 3132. The time indicator 325 includes a first time sub-indicator 325(1) indicating a start time of a start frame of the second video segment 324, and a second time sub-indicator 325(2) indicating an end time of an end frame of the second video segment 324. The time indicator 325 may be associated with all of the first scene label(s) 331 and second scene label(s) 332 corresponding to the second video segment 324. In embodiments where third scene label(s) 333 have been generated, the third scene label(s) 333 are also associated with the time indicator 325 in the content file 316. In this embodiment, one single content file 316 is associated with a video 311. The single content file 316 therefore includes time indicators 325 for every single second video segment 324 of the video 311 and the scene labels corresponding to each second video segment 324 of the video 311. In other embodiments, multiple content files 316 may be generated and associated with the video 311. For example, one content file 316 may correspond to only one second video segment 324 of the video 311 and may provide the scene labels only for that one second video segment 324. In some embodiments, each content file 316 may also include an identification (ID) of the video 311. In some embodiments, each content file 316 may also include contents (e.g., dialogues) of a respective subtitle segment 321 of a second video segment 324 which corresponds to the time indicator 325.

It should be understood that, in embodiments where a machine learning module implements a neural network, each of the various neural networks discussed above may be trained iteratively to minimize a loss function. The loss function is a function that is designed to optimize performance of the respective neural network for a certain task, such as extraction of audio features, performing scene analysis, or extraction of salient words, in order to generate an output (i.e., a label) with a desired accuracy. The training data for training the various neural networks may include videos and subtitle files from a searchable video repository, for example, or the training data may be generated from another suitable source. Furthermore, it should be also appreciated that although the discussion above describes the first, second, and third scene label generators 3151, 3152, 3153, as being implemented at the scene recognition unit 315, the first, second, and third scene label generators 3151, 3152 and 3153 may be implemented at another system or may be implemented across different systems. In other examples, the first scene label generator 3151 may be implemented at a system different than the system 310, whereas the second and third scene label generators 3152, 3153 may be implemented at the system 310. Further, in some examples the functions of the first, second and third scene label generators 3151, 3152, and 3153 may be implemented using a fewer or greater number of units.

Using the first, second, and/or third level scene recognition as discussed above may enable scene labels for each second video segment 324 (or each third video segment 327) to be generated from multiple aspects (e.g., frame analysis based on visual feature, extraction of salient words, and/or extraction of audio features). Such an approach to generate the scene labels may help the generated scene labels to more accurately represent the content of the associated video segment.

Figure 4:
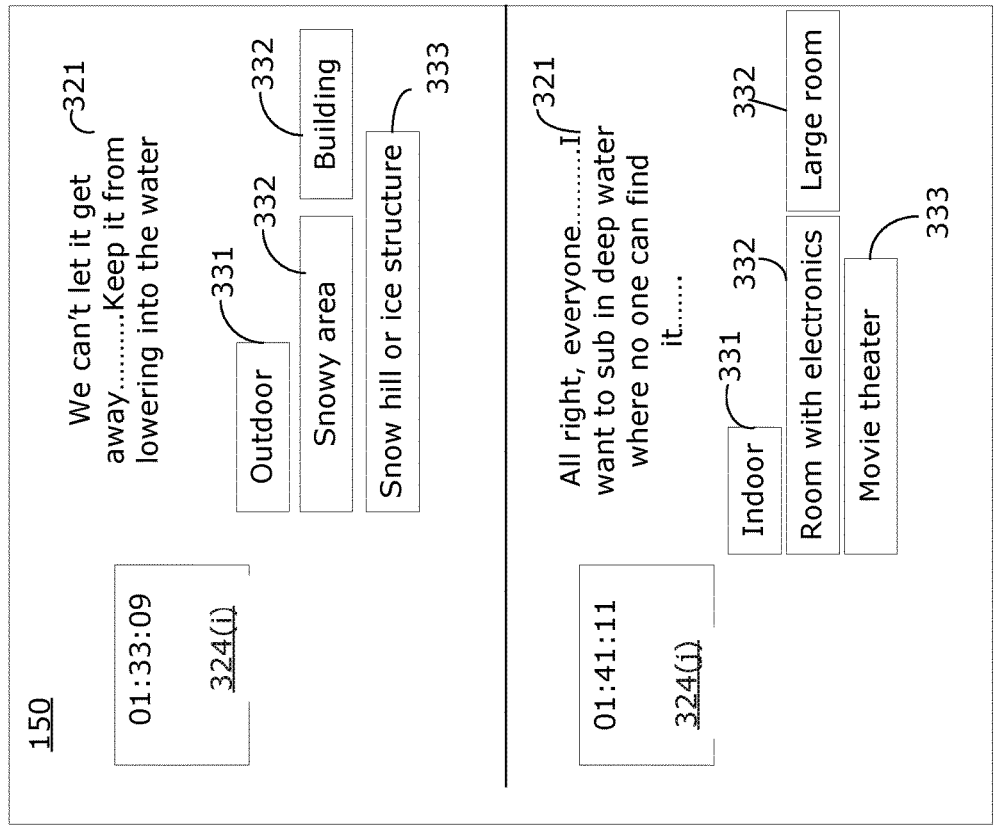
FIG. 4 is a schematic diagram of an example search using video segments and generated content files.
Figure 4:
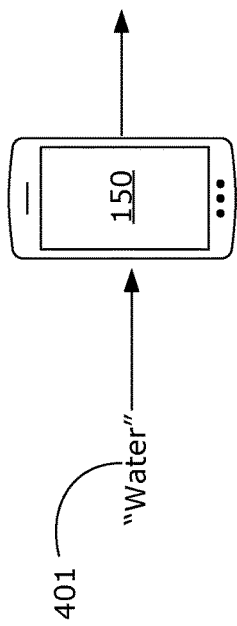

FIG. 4 shows an example for providing video segments as an output when content files associated with the video segments satisfy a query criterion. As shown in FIG. 4, a query 401 (e.g., "water") may be inputted at an ED 150, and the ED 150 may then send the query 401 to a server 102 which performs searching on a plurality of content files online and/or offline. In other examples, any network entity within the communication system 100 may be used to receive the query 401 and the searching may be performed by the same or different network entity. The search may be performed on a local or remote video repository 2081. In some examples, the ED 150 may do the searching on an internal video repository (e.g., in the video repository 2081 within the storage unit(s) 208 of the ED 150). In other examples, the server 102 and the ED 150 may perform searching concurrently. For simplicity, the server 102 is illustrated below as an example to implement all the steps from searching to returning search output, and the content files 316 may also be stored thereon. In other examples, different entities may be used to implement the steps from searching content files to returning search output.

When the query 401 (e.g., "water") is received at the server 102, the server 102 searches content files 316 which are stored thereon to identify scene label(s) that satisfy one or more query criteria. The query criteria can include a criterion that requests scene labels matching or having a semantic meaning similar to the query 401 "water". Thus, one or more content files 316 including a scene label "water" are identified. As shown in FIG. 4, in this example, two content files 316 are identified to include the word "water", and two corresponding second video segments 324 (*i*) and 324(*j*) are identified corresponding to the two content files 316. For each identified content file 316, at least one time indicator (e.g., each including a start time and an end time) associated with the word "water" is identified. The search output may automatically jump to a start frame identified by the frame indicator included in the label associated with the second video segments 324 (*i*) and 324(*j*). All the scene labels (at least one first scene label 331, at least one second scene label 332, and/or at least one third scene label 333) associated with the second video segments 324(*i*) and 324(*j*) are also identified. The subtitle segment 321 associated with the identified frame indicator may be further identified.

As shown in FIG. 4, search results (for example, including a subtitle segment 321, a first scene label "outdoor" 331, a second scene label "snowy area" 332, another second scene label "building" 332, and a third scene label "snow hill or ice structure" scene label 333) may be returned and provided to the ED 150 along with the second video segment 324(*i*). Similarly, another search result (for example, including a subtitle segment 321, a first scene label "indoor" 331, a second scene label "room with electronics" 332, another second scene label "large room" 332, and a third scene label "movie theater" 333) may also be returned and provided to the ED 150 along with the second video segment 324(*j*). By way of non-limiting examples, in other possible configuration, contents of search results returned and provided to the ED 150 may be varied based on predefined communication protocols between the server 102 and the ED 150 or display requirement of the ED 150. For example, the subtitle segment 321 may be omitted or only some of the first, second, and third scene labels associated with the identified second video segment 324 are returned rather than all the first, second, and third scene labels associated with the identified second video segment 324. Any suitable search result or combination may be returned and provided to the ED 150.

Such a method for searching videos may enable a content file satisfying a query criterion to be identified more accurately, and may enable the associated video segment or video to be identified more efficiently. Diversified labels and information associated with the identified video may provide more options and greater convenience for a user to choose a desired video, which may help to improve the user experience.

Referring to FIG. 2 again, as discussed above, the video repository 2081 and content file(s) 316 may be stored within the one or more storage units 208. In some examples, the video repository 2081 may include a respective metadata associated with each video 311. In some examples, each content file 316 may be stored within the metadata associated with each video.

As discussed above, an ED 150 and a server 102 in the communication system 100 may each include a respective processing system 200? In an example operation, the ED 150 may receive a query (e.g., "water") that may be inputted by a user via the input device(s) 214. The ED 150 may then communicate the query to the server 102 (e.g., through the network 130, the cellular network 192, the satellite network, and/or the WLAN 190) using the network interface 206. After the server 102 receives the query, the processing device 205 of the server 102 may search the video repository 2081 (which may be local to the server 102 or external to the server 102). Scene labels which satisfy a query criterion related to the query may be identified by the server 102. In other examples, the identification of the content file(s) 316 may be a task or request sent by the server 102 to be performed by other entities in the communication system 100.

After content file(s) 316 have been identified, the server 102 may then return some or all scene labels of the identified content file(s) 316 to the ED 150 (e.g., via the network 130, the cellular network 192, the satellite network, and/or the WLAN 190) as one or more search results using the network interface 206 of the server 102. The one or more search results may be then displayed at the output device(s) 216 of the ED 150, for a user to review. In some examples, the query (e.g., "water") may be a text input via a UI navigation device provided by the ED 150. In other examples, the query may be a voice input or any other suitable input. Although the query is received via the UI navigation device in this example, in other examples, the query may be received by other methods, such as being received via an online interface.

The present disclosure provides examples in which a video is segmented based on each subtitle segment, which may enable the start frame and the end frame of each video segment to be aligned with the start and end times of a dialogue of the subtitle segment. This approach to video segmentation may help to ensure completeness of each video segment. Various example algorithms are respectively applied to the video segments and subtitle segments, in order to generate scene labels based on scene analysis of the frames of each video segment, and based on the context of dialogue of each subtitle segment. The various algorithms may include machine learning algorithms.

The present disclosure further illustrates example video segmentation in which audio features of each video segment are taken into consideration to merge two or more video segments. This may help enable each video segment to be more accurate.

In some embodiments, another algorithm may be applied to generate additional scene labels based on audio features of each video segment, which may enable generation of scene labels that represent another aspect of the video segment. Such audio-based scene recognition may help to improve accuracy for generating scene labels of each video segment.

In some embodiments, scene labels generated based on frame analysis, subtitle segment, and/or audio features may be included in a content file, which may be stored as a metadata associated with a video (e.g., video 311). The content file may enable the generated scene labels and the generated video segments to be managed more efficiently and conveniently.

In some embodiments, one or more video segments associated with a scene label (or scene labels) which satisfies a query criterion may be identified and provided as a search output. The scene label (or scene labels) which satisfies the query criterion may be also in the search output (e.g., returned and displayed on the ED for users to review).

Examples of the present disclosure have been described in the context of software implementation in a device (e.g., a server and/or an ED). It should be understood that the disclosed methods and systems may be implemented on a hardware device, such as a system on a chip, comprising circuitry configured to perform the functions of the various machine learning modules described herein. For example, the disclosed methods may be carried out by software executed by any suitable processing unit, such as a computing device, a workstation, an autonomous vehicle or non-vehicular device. Coding of such software is within the scope of a person of ordinary skill in the art. Machine-readable code (or instructions) may be stored in a non-transitory machine readable medium, such as the memory of a processing unit. In some examples, the disclosed methods may be carried out by software executed by a processor of a single physical machine (e.g. computer), a set of physical machines (e.g., computers), or one or more virtual machines running on a computing cluster, or one or more virtual machines provided by a cloud computing service.

Although the present disclosure describes methods and processes with action in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, comprising:
receiving a video comprising a plurality of frames, and a subtitle file associated with the video;
performing video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment;
parsing the subtitle file associated with the video to generate one or more subtitle segments based on a start time and an end time of each dialogue in the subtitle file; and
generating a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

2. The method of claim 1, further comprising:
generating, for each second video segment of the second set of video segments, at least one respective first scene label based on scene analysis of a sequence of frames of the second video segment;
generating, for each second video segment of the second set of video segments, a content file comprising the at least one respective first scene label generated for the second video segment.

3. The method of claim 2, wherein generating, for each second video segment the at least one first scene label for comprises:
dividing the second video segment into one or more sub-segments;
for each sub-segment:
determining a representative frame of the sub-segment; and
performing the scene analysis on the representative frame to generate the at least one first scene label corresponding to the sub-segment;

wherein the at least one first scene label generated for each second video segment of the second set of video segments includes the first scene label generated for each of the plurality of sub-segments.

4. The method of claim 3, wherein each sub-segment includes at least one frame, and determining a representative frame of the sub-segment comprises:
calculating respective scene confidence of each frame; and
selecting a frame which satisfies a confidence criterion as the representative frame.

5. The method of claim 2, further comprising generating, for each second video segment, at least one second scene label based on the dialogue of a subtitle segment corresponding to the second video segment, and wherein the at least one second scene label for the second video segment is generated by:
extracting one or more words of interest of the corresponding subtitle segment; and
selecting one or more representative words to be included in the second scene label, the one or more representative words being selected from a predefined dataset to represent one or more meanings of the one or more words of interest.

6. The method of claim 2, wherein each first scene label is associated with a confidence score.

7. The method of claim 2, wherein further comprising:
identifying at least one second video segment associated with the scene label that satisfies a query criterion; and
providing the at least one identified second video segment and one or more the first scene label and one or more second scene label associated with each identified second video segment as an output.

8. The method of claim 1, wherein generating the second set of video segments further comprises:
extracting, from an audio file corresponding to a respective video segment, one or more audio features corresponding to the video segment;
merging two or more video segments to generate a respective second video segment, the two or more video segments corresponding to audio files having audio features that satisfy a similarity criterion.

9. The method of claim 8, wherein the at least one first scene label is generated for each second video segment after the further merging.

10. The method of claim 1, the method further comprising:
for each second video segment, extracting audio features from an audio file of the second video segment, and generating at least one third scene label based on the audio features of the audio file;
wherein generating the content file further comprises adding the at least one third scene label corresponding to each second video segment of the second set of video segments to the content file.

11. A system comprising:
a memory storing instructions;
one or more processors coupled to the memory and configured to execute the instructions to:
receive a video comprising a plurality of frames, and a subtitle file associated with the video;
perform video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment;
parse the subtitle file associated with the video to generate one or more subtitle segments based on a start time and an end time of each dialogue in the subtitle file; and
generate a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

12. The system of claim 11, wherein the one or more processors are further configured to execute the instructions to:
generate, for each second video segment of the second set of video segments, at least one respective first scene label based on scene analysis of a sequence of frames of the second video segment; and
generate, for each second video segment of the second set of video segments, a content file comprising the at least one respective first scene label generated for the second video segment.

13. The system of claim 12, wherein the one or more processors are further configured to execute the instructions to:
divide the second video segment into one or more sub-segments;
for each sub-segment:
determine a representative frame of the sub-segment; and
perform the scene analysis on the representative frame to generate the first scene label corresponding to the sub-segment;
wherein the at least one first scene label generated for the second video segment of the second set includes the first scene label generated for each of the plurality of sub-segments.

14. The system of claim 13, wherein each sub-segment includes at least one frame, the one or more processors are further configured to execute the instructions to:
calculate respective scene confidence of each frame; and
select a frame which satisfies a confidence criterion as the representative frame.

15. The system of claim 12, wherein the one or more processors further execute the instructions to generate the at least one second scene label by:
extracting one or more words of interest of the corresponding subtitle segment; and
selecting one or more representative words to be included in the second scene label, the one or more representative words being selected from a predefined dataset to represent one or more meanings of the one or more words of interest.

16. The system of claim 12, wherein each first scene label is associated with a confidence score.

17. The system of claim 11, wherein the one or more processors are further configured to execute the instructions to generate the second set of video segments by:
extracting, from an audio file corresponding to a respective video segment, one or more audio features corresponding to the video segment;
merging two or more video segments to generate a respective second video segment, the two or more video segments corresponding to audio files having audio features that satisfy a similarity criterion.

18. The system of claim 17, wherein at least one first scene label is generated for each video segment after the further merging.

19. The system of claim 11, wherein the one or more processors are further configured to execute the instructions to:
for each second video segment of the second set, extract audio features from an audio file of the second video segment, and generate at least one third scene label based on the audio features of the audio file;
wherein the content file further comprises the at least one third scene label corresponding to each second video segment of the second set of video segments.

20. A non-transitory computer-readable medium storing instructions which, when executed by a processor cause the processor to
receive a video comprising a plurality of frames, and a subtitle file associated with the video;
perform video segmentation on the video to generate a first set of video segments comprising one or more video segments based on a frame-by-frame comparison of features in the frames of the video and to generate a label for each video segment in the first set of video segments, wherein the label for each video segment comprises an indicator a start and an end the video segment;
parse the subtitle file associated with the video to generate one or more subtitle segments based on a start time and an end time of each dialogue in the subtitle file; and
generate a second set of video segments comprising one or more second video segments and a label for each second video segment based on the video segments of the first set of video segments and the subtitle segments, the second set of video segments including: at least one merged video segment generated by merging two or more video segments of the first set of video segments that correspond to a common subtitle segment, any remaining video segments of the first set of set of video frames that are unmerged.

* * * * *